United States Patent

[11] 3,557,912

| [72] | Inventor | James E. MacAfee<br>Troy, Mich. |
|---|---|---|
| [21] | Appl. No. | 795,790 |
| [22] | Filed | Feb. 3, 1969 |
| [45] | Patented | Jan. 26, 1971 |
| [73] | Assignee | Chrysler Corporation<br>Highland Park, Mich.<br>a corporation of Delaware |

[54] DUO-SERVO DRUM BRAKE AND MECHANICAL ACTUATING MEANS THEREFOR
1 Claim, 5 Drawing Figs.

| [52] | U.S. Cl. ...................................................... | 188/78, |
|---|---|---|
| | | 74/96; 188/70 |
| [51] | Int. Cl. ...................................................... | F16d 51/22 |
| [50] | Field of Search .......................................... | 188/78, |
| | 78.35, .36, 70, 106F; 74/96 | |

[56] References Cited
UNITED STATES PATENTS

| 2,034,977 | 3/1936 | Lavaud..................... | 188/78(.35) |
|---|---|---|---|
| 2,036,385 | 4/1936 | Amirault.................. | 188/78(.22) |
| 2,981,377 | 4/1961 | Brisson..................... | 188/78(.35) |
| 3,023,853 | 3/1962 | Nawrot..................... | 188/78 |
| 3,122,221 | 2/1964 | Rucker...................... | 188/70X |

FOREIGN PATENTS

| 262,933 | 10/1965 | Australia.................... | 188/106(F) |
|---|---|---|---|

*Primary Examiner*—George E. A. Halvosa
*Attorney*—Harness, Talburtt and Baldwin

ABSTRACT: This disclosure relates to a manually operated parking brake for a disc brake for automotive vehicles. Duo-servo arcuate shoes are connected for manually actuated engagement with the internal annular peripheral surface of the disc and an adjustable link extends between the two shoes radially inwardly from their ends to increase the output force from the brake.

INVENTOR.
James E. MacAtee.
BY
Harness, Talburtt & Baldwin,
ATTORNEYS.

PATENTED JAN 26 1971

INVENTOR.
James E. MacAfee.
BY
Hanness, Talburtt & Baldwin
ATTORNEYS 3,557,912

DUO-SERVO DRUM BRAKE AND MECHANICAL ACTUATING MEANS THEREFOR

BACKGROUND OF INVENTION

This invention relates to brakes for vehicles, and more particularly to a manually operated parking brake adapted to engage the inner periphery of a disc.

It has been proposed in the prior art to provide an independent mechanically operated brake which operatively engages the outer or inner peripheral surface of the disc of a fluid-actuated disc brake structure. Such structures usually included a disc brake having one or more pistons located on opposite sides of a rotatable disc. The piston or pistons are hydraulically actuated to force brake linings into engagement with the disc. The housing structure for the pistons takes up considerable space. The parking brake-actuating mechanism in these structures, is, due partly to the space requirements of the disc brake mechanism, usually located at a point spaced circumferentially from the disc brake mechanism, and is adapted to actuate a pair of brake shoes against the internal surface of the disc, which surface constitutes a drum.

SUMMARY OF THE INVENTION

This invention relates to a duo-servo parking brake for a disc brake construction, the duo-servo brake being constructed in such manner that the input force to the secondary shoe is increased over conventional duo-servo brakes.

One of the primary objects of this invention is to provide a disc brake having a manually operated parking brake which engages the inner periphery of the disc and operates on the duo-servo brake principle.

Another object of the present invention is to provide a disc brake having a parking brake, such as described which is adapted to be equally effective against forward and reverse movement of the vehicle.

A further object of this invention is to provide parking brake apparatus of the class described wherein the parking brake is operated by a novel device adapted to apply a force on a pair of duo-servo brake shoes so that the force on the secondary shoe is substantially increased over that applied to the secondary shoe of prior known devices.

Another object of the present invention is to provide parking brake apparatus which is compact and may be easily assembled and installed.

A further object of this invention is to provide parking brake apparatus such as described which is economical in construction and reliable in operation.

Other objects and features of this invention will become apparent as the description progresses.

DESCRIPTION OF THE DRAWINGS

In the accompanying drawings, in which one of various possible embodiments of this invention is illustrated.

FIG. 5 is a section taken generally along line 5-5 of FIG. 4, certain parts being removed for clarity.

Like parts are indicated by corresponding reference characters throughout the several views of the drawings.

DESCRIPTION OF THE PREFERRED EMBODIMENT

Figure 2:
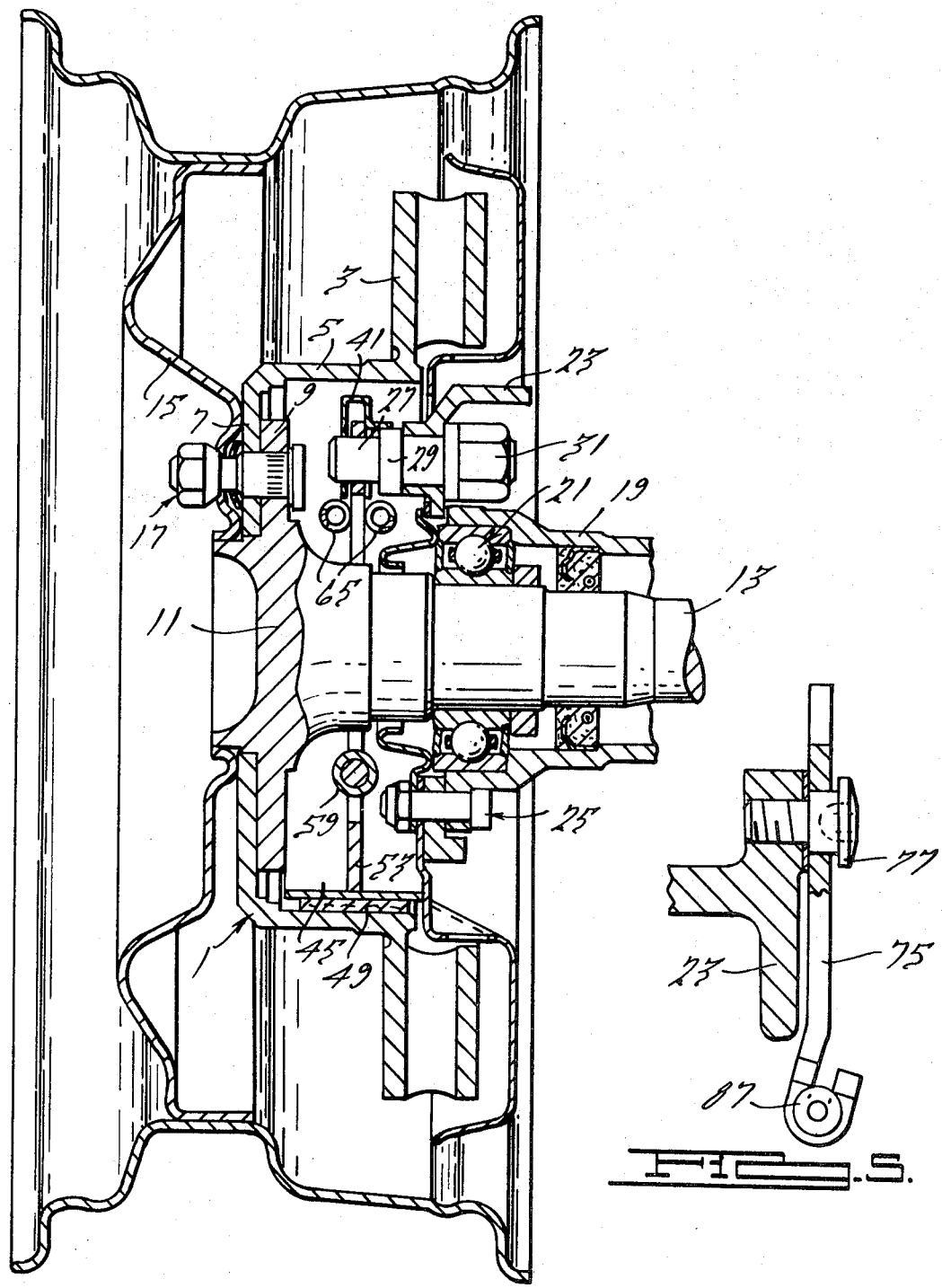
FIG. 2 is a vertical section taken along line 2-2 of FIG. 1, with the wheel with which the apparatus is associated being shown.

Referring now to the drawings, a disc for a disc brake is generally indicated at 1. The disc 1 includes an annular disc brake portion 3 (FIG. 2) adapted to be engaged by a disc brake (not shown). Extending axially from the inside edge of portion 3 is annular drum section 5 having an internally directed flange 7 secured to a flange 9 of a hub 11 located on the end of a driven axle 13.

A wheel 15 is secured to the flanges 7 and 9 by bolt and nut assemblies 17. A relatively fixed force receiving member or forging 19 surrounds axle 13 and is connected to hub 11 by a bearing 21. An adapter 23 may be integrally formed with forging 19 or connected thereto by fasteners 25.

An anchor pin 27 extends through adapter 23 toward flange 7. Pin 27 has an enlarged portion 29 on one side of adapter 23 and a nut 31 on the other side of the adapter to secure the pin to the adapter. The adjacent ends 33 and 35 of duo-servo arcuate brake shoes 37 and 39 normally engage opposite sides of the anchor pin 27. A retaining clip or guide 41 passes over ends 33 and 35 of the shoes and has holes through which pin 27 passes. The brake shoes 37 and 39 have axially extending rim portions 43 and 45 which have brake linings 47 and 49 thereon. The rim portions 43 and 45 are provided with centrally located radially extending webs 51 and 53, respectively so that the brake shoe structures are in the form of T-shaped elements having generally arcuate contours adapted to fit inside the axially extending wall 5 of disc 1.

Normally, the opposite ends 55 and 57 of duo-servo brake shoes engage an adjusting strut for moving the shoes closer to the annular drum wall 5 as the shoe linings wear and for transferring the output force of one shoe to the other shoe. However, as explained hereinafter, it has been found that by moving the adjusting strut inwardly toward the axis of rotation of the wheel, the torque output of the brake is increased relative to the input force to the brake. If the adjusting member is moved too far towards the axis, a self-locking condition may be presented in the primary shoe. In this regard, an adjustable adjusting link 59 extends between intermediate portions 61 and 63 of the webs 51 and 53, approximately one-third of the distance between the axis of rotation of the wheel and a line joining the midpoints of the ends of the linings 47 and 49.

The ends 33 and 35 of shoes 37 and 39 are biased toward anchor pin 27 by springs 65 located on opposite sides of webs 51 and 53 and hooked through holes 67 and 69 in the webs.

Figure 3:
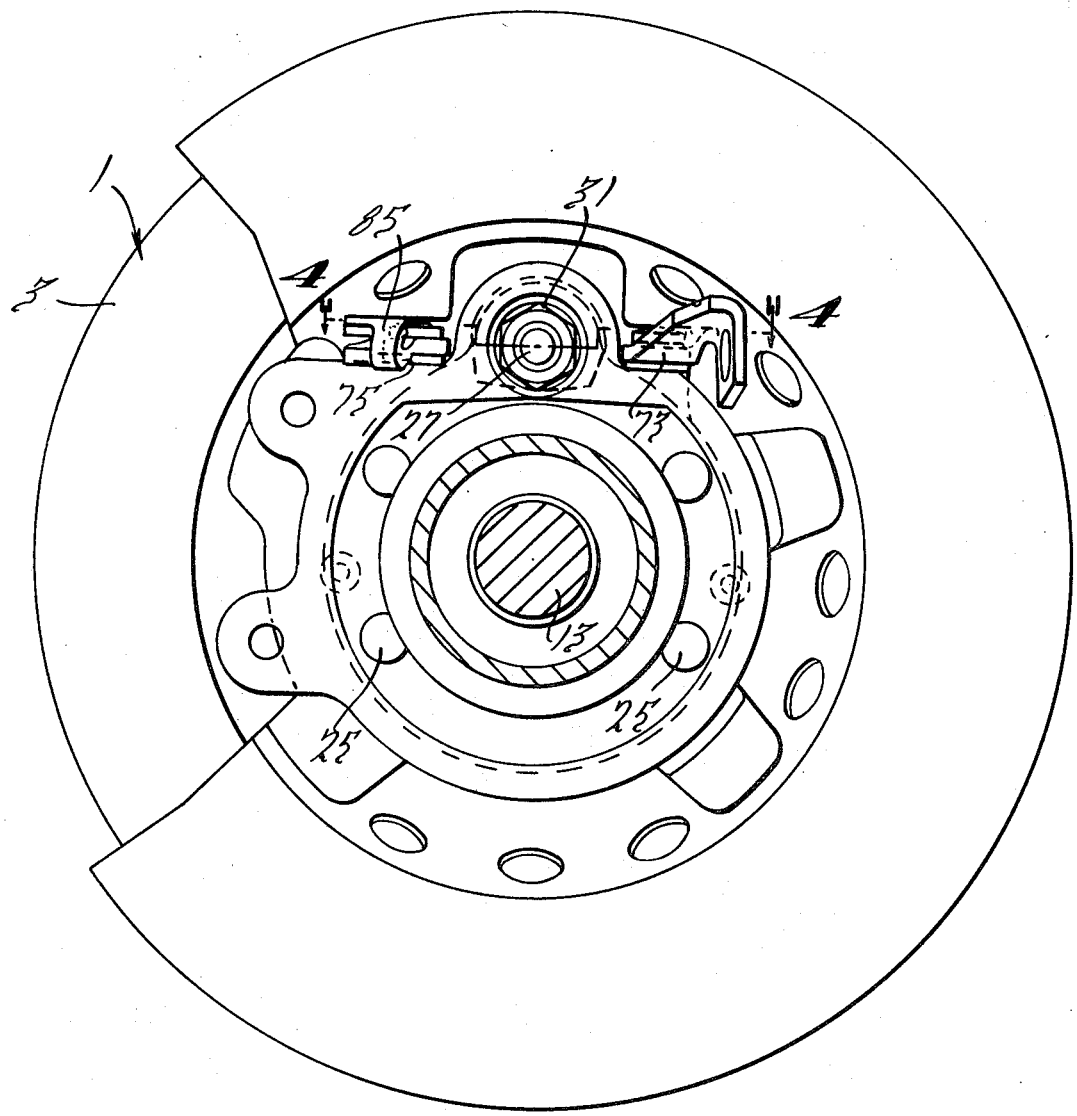
FIG. 3 is an elevation view of the apparatus shown in FIG. 1, taken from the inner side of the wheel.
Figure 4:
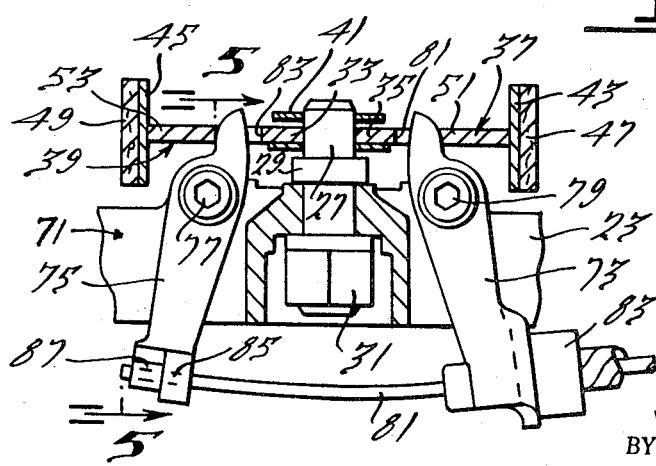
FIG. 4 is a section taken along line 4-4 of FIG. 3, certain parts being removed for clarity.

The shoes 37 and 39 are adapted to be moved outwardly into engagement with the annular wall 5 of disc 1 by an actuating mechanism generally indicated at 71 in FIGS. 3, 4, and 5. It includes two levers 73 and 75 pivotally connected, as by fasteners 77 and 79, for example, to the adapter 23. The ends of levers 73 and 75 extend through openings 81 and 83 in the webs 51 and 53 of the brake shoes.

A cable or wire 81, one end of which is connected to a manually actuated tensioning device (not shown), extends through a guide 83 located in an opening in the outer end of lever 73. Cable 81 extends through a recess formed in the outer end of lever 75 by an inturned portion 85 and has a bead or enlarged member 87 on its free end to prevent withdrawal of the cable from the outer end of lever 75. Guide 83 and the cable covering serve as the reaction member when force is applied to cable 81 to the right as viewed in FIG. 4.

Figure 1:
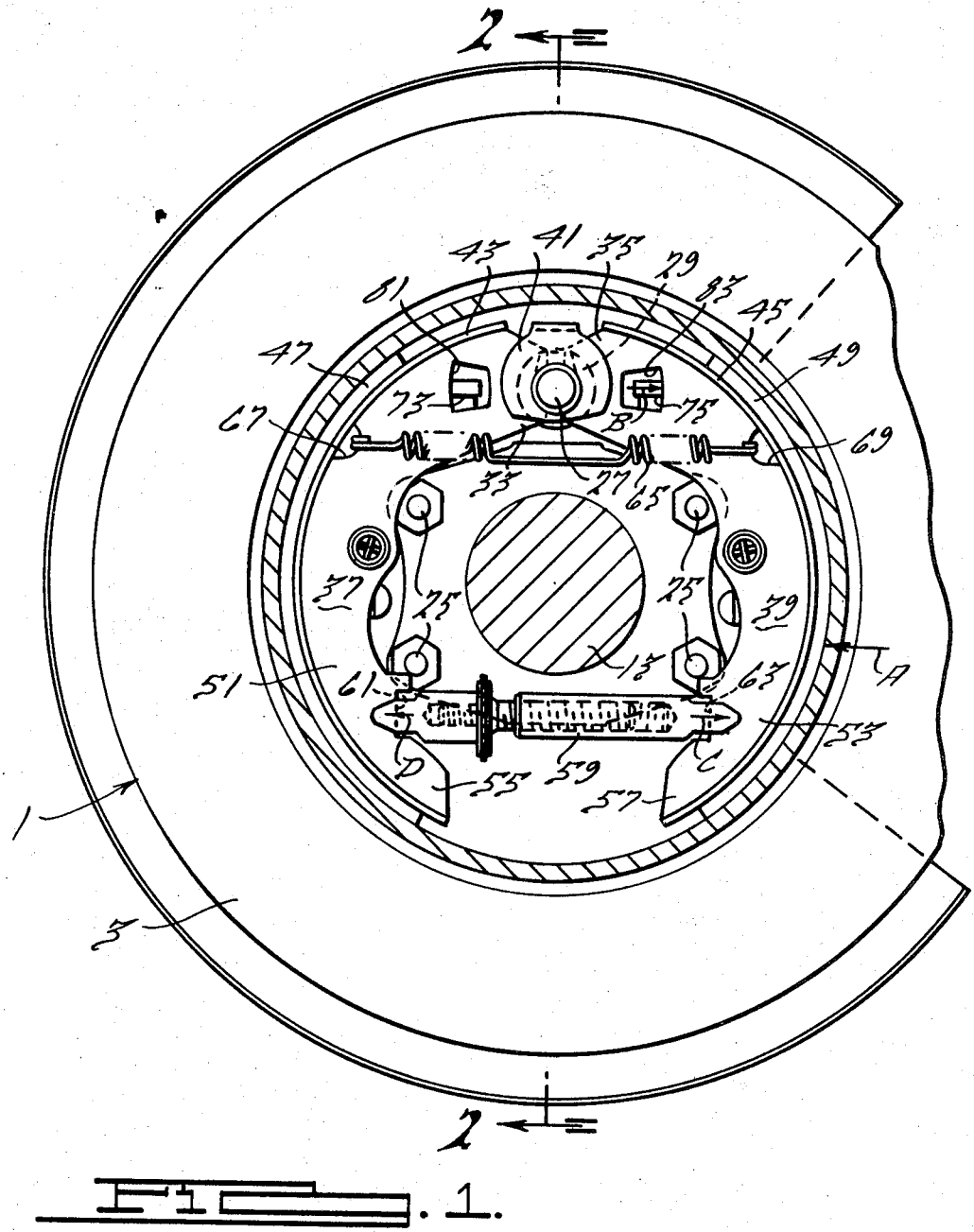
FIG. 1 is an elevational view of a parking brake apparatus, constructed in accordance with this invention, mounted on a wheel, certain parts being broken away and removed for clarity.

The reason the link 59 is moved toward the axis of rotation of the wheel will now be explained. Assuming the wheel and disc are rotating or tending to rotate clockwise as viewed in FIG. 1, the shoe 39 will be the primary shoe and the shoe 37 will be the secondary shoe as is well-known in duo-servo brake terminology. There are three forces acting on the primary shoe 39. First, there is the input force applied by the lever 75 to the shoe. Second, there is the drum/lining force which is the sum of all pressure and friction forces between the drum 5 and the primary shoe. The sum of the pressure forces can be represented by a single radially directed force, and the sum of the friction forces is equal to the radial force times the coefficient of friction. The point of action of the radial and friction forces lies on a radially extending line whose angle below a horizontal line, extending through the axis of axle 13 depends mainly or primarily on the coefficient of friction. Assuming the input force to be applied in a horizontal direction and the link 59 to extend horizontally, the resultant force of the pressure forces and the friction forces is directed along a horizontal line represented in FIG. 1 by A. The input force of lever 75 is indicated by line B. To maintain a force balance the moments about the axis of axle 13 must balance. As viewed in FIG. 1, the moments about the axis of axle 13 due to forces A and B are additive and are both clockwise. The only force opposing the forces A and B is the link force or the reaction force exerted on shoe 39 by link 59. It will be seen that if the link 59 extended between the ends 55 and 57 of shoes 37 and 39, a relatively long moment arm would be provided between the axis of axle 13 and the link 59. The length of the moment arm thus determines the reaction or link force C opposing forces A and B. By moving the link 59 closer to the axis of axle 13 as indicated in FIG. 1, the force C must necessarily become larger. This reaction force C, which is also the input force D for the secondary shoe 37, will be many times greater than the input force B, due to the location of the link 59 and the servo effect of the brake assembly. If the link 59 is moved up to be directly along the line of action of force A, the shoe will become self-locking and hence will not release.

Since the output force or reaction force of the primary shoe 39 is the input force to the secondary shoe 37, the contribution of the secondary shoe is increased significantly by moving the link inwardly toward the axis of axle 13 from the ends of the shoes. It will be understood that if the wheel is rotating counterclockwise as viewed in FIG. 1, the shoe 37 becomes the primary shoe while the shoe 39 becomes the secondary shoe.

In view of the foregoing, it will be seen that the several objects and other advantages of the invention will be apparent.

It will be understood that the invention is not to be limited to the exact constructions shown and described, but that various changes and modifications may be made without departing from the spirit and scope of the invention.

I claim:

1. Duo-servo emergency brake apparatus for a vehicle wheel having a disc brake, said disc brake including an annular drum surface, comprising a support, first and second brake shoes engageable with said surface, actuating means for applying a separating force to two adjacent ends of said shoes, said two adjacent ends of said shoes being on one side of the axis or rotation of the wheel, the opposite ends of said shoes being on the opposite side of said axis, a link extending between said shoes and located on said opposite side of said axis to transmit force from one shoe to the other when said two adjacent ends of the shoes are separated by said actuating means, said link being located radially inwardly from said opposite ends of said shoes toward said axis to substantially increase the input force applied to one shoe by the other shoe over the input force which would be transferred if the link extended between said opposite ends of said shoes, said actuating means including a pair of levers pivotally connected to said support, one end of each lever being engageable with a different shoe, and means connected to the other ends of said levers for moving said other end of said levers toward one another, thereby causing said one end of each of said levers to bias the adjacent ends of said shoes away from one another, said shoes having radially extending webs and axially extending rims, said webs near said adjacent ends of said shoes having openings therein through which said one end of said levers extend, a pair of springs located on opposite sides of said webs between said axis and said actuating means, the ends of said springs being hooked through holes in said webs adjacent said rims, said shoes having linings thereon, the distance between said axis and a line extending from one shoe to another through said link being greater than the distance between said axis and a line along which the resultant of the friction and radial forces on one shoe during brake application is directed, but less than the distance between said axis and adjacent ends of said linings.